United States Patent
Wyman et al.

(10) Patent No.: US 6,880,286 B2
(45) Date of Patent: Apr. 19, 2005

(54) SELF-PROPELLED CAST FISHING SYSTEM

(76) Inventors: Dennis Wyman, 11 Sparkleberry, Amelia Island, FL (US) 32034; Salvatore Mucaro, 2811 Tidewater St., Fernandina Beach, FL (US) 32034

( * ) Notice: Subject to any disclaimer, the term of this patent is extended or adjusted under 35 U.S.C. 154(b) by 0 days.

(21) Appl. No.: 10/673,814

(22) Filed: Sep. 29, 2003

(65) Prior Publication Data
US 2004/0134115 A1 Jul. 15, 2004

Related U.S. Application Data
(60) Provisional application No. 60/414,100, filed on Sep. 27, 2002.

(51) Int. Cl.$^7$ ............................................. A01K 91/02
(52) U.S. Cl. ....................................................... 43/19
(58) Field of Search ............................. 43/19; 124/16; 242/373, 378

(56) References Cited

U.S. PATENT DOCUMENTS

| | | | | |
|---|---|---|---|---|
| 1,140,608 A | * | 5/1915 | Phillips ........................... | 43/19 |
| 1,469,883 A | * | 10/1923 | Brakers ........................... | 43/19 |
| 1,473,507 A | * | 11/1923 | August ............................ | 43/19 |
| 2,218,045 A | * | 10/1940 | Martellucci ...................... | 43/19 |
| 2,225,719 A | * | 12/1940 | Shotton ............................ | 43/19 |
| 2,247,561 A | * | 7/1941 | Rowe ............................... | 43/19 |
| 2,529,901 A | * | 11/1950 | Behrens ......................... | 124/17 |
| 2,569,604 A | * | 10/1951 | Hall .................................. | 43/19 |
| 2,605,569 A | * | 8/1952 | Kronhaus et al. .............. | 43/19 |
| 2,645,218 A | * | 7/1953 | Fisher .............................. | 43/19 |
| 2,662,329 A | * | 12/1953 | Henry .............................. | 43/19 |
| 2,672,304 A | * | 3/1954 | Kaufman ...................... | 242/373 |
| 2,849,824 A | * | 9/1958 | McGee ............................ | 43/19 |
| 2,873,547 A | * | 2/1959 | Coelho ............................. | 43/19 |
| 3,005,215 A | * | 10/1961 | Colt et al. .................... | 242/373 |
| 3,052,055 A | * | 9/1962 | Hayward ........................ | 43/19 |
| 3,084,467 A | * | 4/1963 | Bromwell ....................... | 43/19 |
| 3,217,442 A | * | 11/1965 | Nygren ........................... | 43/19 |
| 3,245,170 A | * | 4/1966 | Stewart ........................... | 43/19 |
| 3,365,834 A | * | 1/1968 | Kreft ............................... | 43/19 |
| 3,390,479 A | * | 7/1968 | Hamilton ....................... | 43/19 |
| 3,400,480 A | * | 9/1968 | Warsham ....................... | 43/19 |
| 3,503,570 A | * | 3/1970 | Coshow ...................... | 242/309 |
| 3,509,863 A | * | 5/1970 | Barker ......................... | 124/16 |
| 3,656,252 A | * | 4/1972 | Sherman ........................ | 43/19 |
| 3,812,589 A | * | 5/1974 | Schultheis ............... | 242/156.1 |
| 3,889,896 A | * | 6/1975 | O'Hara ....................... | 242/386 |
| 3,941,397 A | | 3/1976 | Kidder et al. | |
| 3,969,914 A | | 7/1976 | Dennen | |
| 4,005,764 A | | 2/1977 | Terzian et al. | |
| 4,018,002 A | | 4/1977 | Holden | |
| 4,040,198 A | * | 8/1977 | Skibo ............................. | 43/19 |
| 4,131,925 A | | 12/1978 | Firth et al. | |
| 4,161,679 A | | 7/1979 | Kohn et al. | |
| 4,276,714 A | | 7/1981 | Albert et al. | |
| 4,301,372 A | | 11/1981 | Giering et al. | |
| 4,339,889 A | | 7/1982 | Guerrero et al. | |

(Continued)

FOREIGN PATENT DOCUMENTS

| | | | | |
|---|---|---|---|---|
| FR | 1139086 A1 | * | 6/1957 | ................... 43/19 |
| GB | 2155291 A1 | * | 9/1985 | |

Primary Examiner—Darren W. Ark
(74) Attorney, Agent, or Firm—Matthew W. Baca; Dillon & Yudell LLP

(57) ABSTRACT

The present invention is directed to providing self-propelled casting within a fishing apparatus that is the functional replacement of a conventional rod and reel combination. The system and method of the present invention advantageously include utilization of a self-propelled casting apparatus that employs a constant torque spring motor to provide a flat torque/force response both in the loading and releasing phases of a casting cycle. The casting apparatus employs a point-and-release method of safely and accurately casting a bobber or other article of fishing tackle over a specified distance.

31 Claims, 8 Drawing Sheets

U.S. PATENT DOCUMENTS

| | | |
|---|---|---|
| 4,467,555 A | 8/1984 | Terzian et al. |
| 4,474,366 A | 10/1984 | Reider |
| 4,602,360 A | 7/1986 | Porcelli |
| 4,665,839 A | 5/1987 | Heyl |
| 4,682,437 A * | 7/1987 | Akerberg ........... 43/19 |
| 4,719,992 A * | 1/1988 | Elward et al. ........... 242/373 |
| 5,104,056 A * | 4/1992 | Jannotta et al. ........... 242/373 |
| 5,193,298 A * | 3/1993 | O'Neill ........... 43/19 |
| 5,261,882 A | 11/1993 | Sealfon |
| 5,336,189 A | 8/1994 | Sealfon |
| RE35,249 E | 5/1996 | Sealfon |
| 5,926,991 A * | 7/1999 | Chesnut ........... 43/19 |
| 6,121,864 A | 9/2000 | Tillmann |

\* cited by examiner

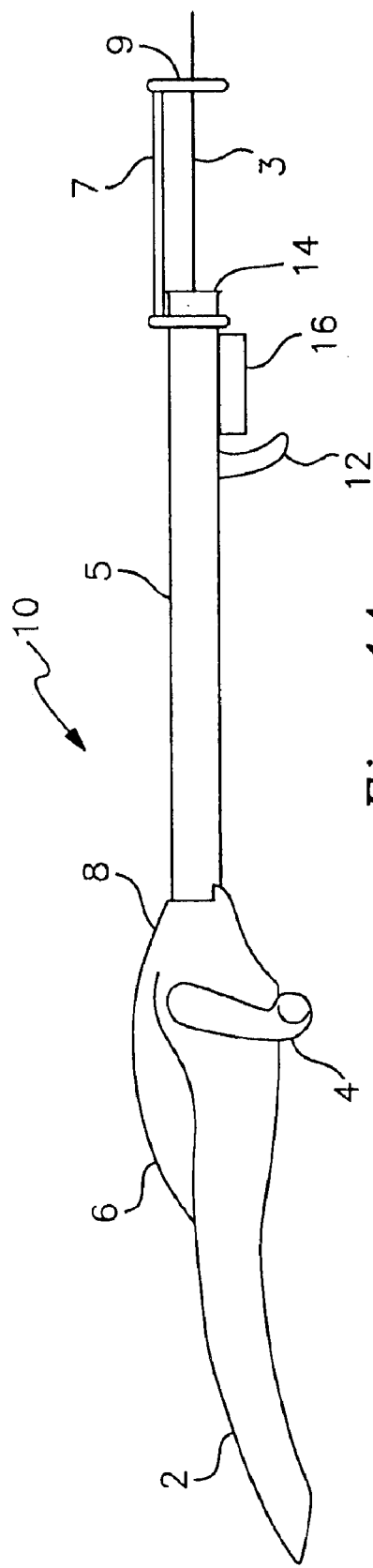
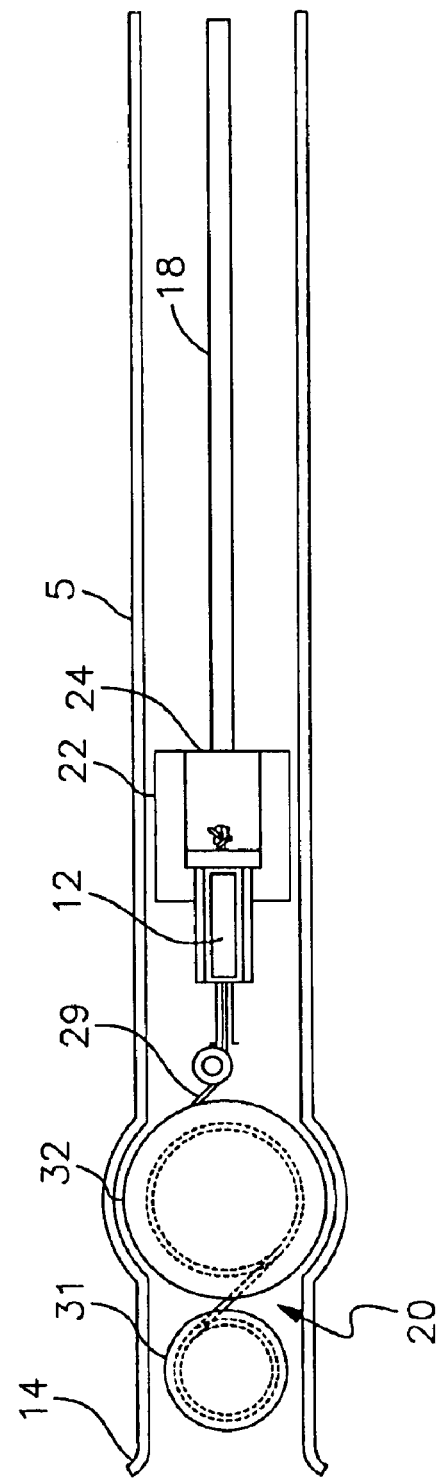
Fig. 1A
Fig. 1B

SELF-PROPELLED CAST FISHING SYSTEM

CROSS REFERENCE TO RELATED APPLICATIONS

This application claims the benefit of and priority from U.S. provisional patent application Ser. No. 60/414,100, entitled "FISHING SYSTEM HAVING SELF-PROPELLED CASTING APPARATUS," and filed on Sep. 27, 2002, the content of which is incorporated herein in its entirety.

BACKGROUND OF THE INVENTION

1. Technical Field

The present invention relates in general to methods and devices utilized for fishing, and in particular to an improved apparatus and method for projecting a lure, bait, sinker, or other article of fishing tackle from a user-handled fishing device and a comprehensive and integrated fishing system and method for use with the same.

2. Description of the Related Art

As fishing continues to grow in popularity as a sport and recreational activity, ever improving methods and systems are being developed for broadening access to and improving methods of fishing. Different fishing styles and conditions require differing fishing equipment including different types of rods, reels, line, bait, lures, floats, sinkers, etc.

Although different fishing contexts invite or require different types of equipment or different fishing techniques, some features of fishing are common to most situations. One of the most fundamental of all fishing techniques is that of "casting" a fastened bait or lure article into a desired location on the water. A person handling a rod-and-reel combination casts a bait using a rotational motion of the rod. In this manner, the rod is utilized to "throw" the bait in much the same way as an arm throws a ball or a stone. The rod starts in a tilted back position opposite the intended cast direction while the bait is typically pulled up and held near the rod tip. When the cast is started, the fishing line must be manually or mechanically "locked" to the rod and reel so that the bait will, upon release, properly follow the direction of the rod tip. As the rod is rotated forward, the relatively high velocity at the tip of the rod imparts a corresponding velocity on the bait which then travels in a direction and to a distance as determined by the force and direction applied in the rotation. Casting, along with other manual fishing techniques, often pose considerable challenges for younger, novice, or handicapped anglers.

A longtime favorite fishing setup that is particularly well-suited for younger or inexperienced anglers includes a so-called closed-face spincast reel together with a suitable rod. Spincast reels are well-known to fisherman and are widely produced and readily available in most retail stores that carry fishing equipment and gear. By design spincast reels provide for relatively simple line spooling and handling features, making them a popular choice for younger or less experienced anglers. Although spincast reels address many of the problems associated with line handling, the ability to cast fishing tackle having exposed hooks accurately and safely remains a barrier for many would-be anglers. The technique required for casting also poses substantial difficulties often to the extent that the individual simply cannot cast effectively and must rely on an experienced angler to perform the casting portion of the fishing experience.

A situation arising somewhat independently of the angler's ability in which conventional casting techniques can be problematic occurs when fishing in close proximity to other people or near a structure that limits the possible range of motion during casting. Such situations may frequently arise, for example, on crowded boats, piers, and banks in which swinging fishing tackle having exposed hooks poses a significant hazard to oneself and/or nearby persons. In these situations, the ability to deliver a bait or lure to a desired location on the water is substantially limited by the mechanics of conventional manual casting techniques which require the angler to swing, sway, roll, flip, or otherwise move the end of the fishing rod or pole to effectuate a directed launching of the lure or bait.

It can therefore be appreciated that a need exists for an improved device and method for addressing the foregoing problems associated with casting fishing tackle easily, safely, and accurately. The present invention addresses such a need.

SUMMARY OF THE INVENTION

A self-propelled cast fishing apparatus and method for using the same are disclosed herein. In accordance with one embodiment the apparatus includes a support member in the form of a hollow barrel tube in which an article of fishing tackle is withdrawn in preparation for casting. A constant torque spring (CTS) motor having a strip-like spring material wound onto one or more storage drums and one or more output drums is fixedly positioned with respect to the hollow barrel tube. The CTS motor is loaded during a loading phase of a casting cycle by winding the spring material from the one or more storage drum onto the one or more output drum. During a release phase of the casting cycle, the spring material rotatably unwinds from the output drum onto the storage drum imparting a low-impulse propulsion force that is translated to a linear force for propelling the article of fishing tackle from the hollow barrel tube during a release phase of a casting cycle.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1A illustrates a self-propelled cast fishing apparatus in accordance with one embodiment of the present invention;

FIG. 1B depicts a cross-section underside view of the self-propelled cast fishing apparatus shown in FIG. 1A;

DETAILED DESCRIPTION OF A PREFERRED EMBODIMENT

Figure 1C:
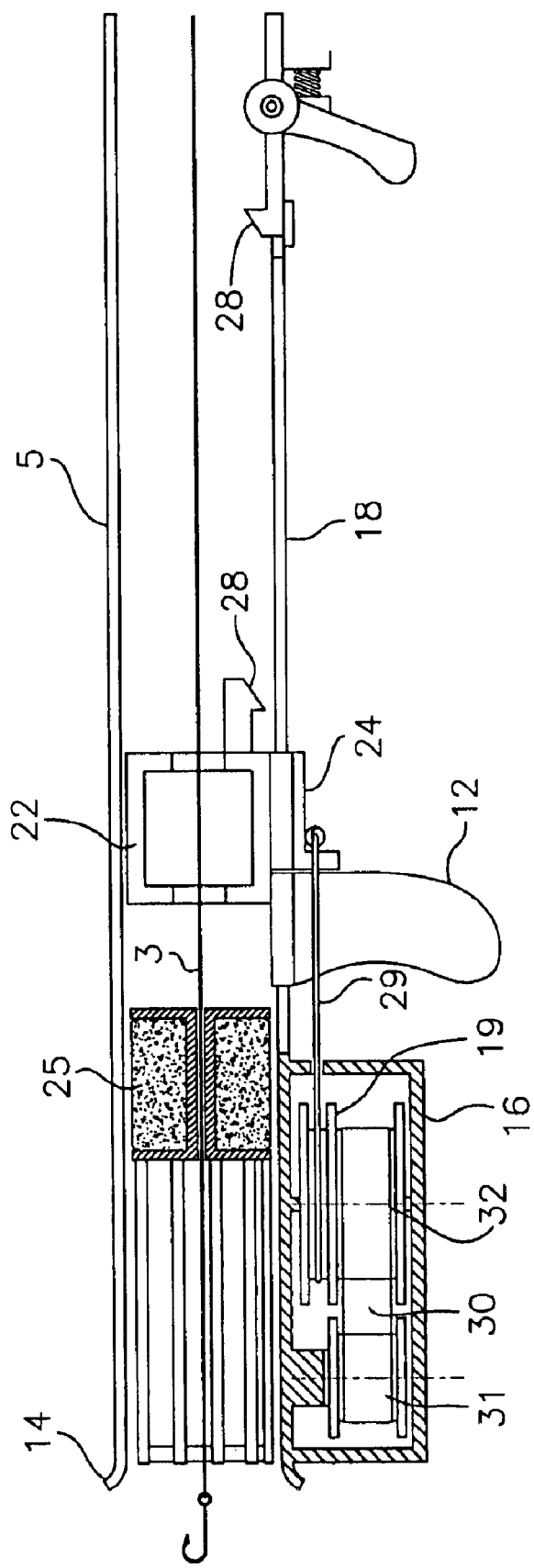
FIG. 1C illustrates a cross-section side view of the self-propelled cast fishing apparatus shown in FIG. 1A.

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

The present invention is generally directed to an improved fishing apparatus, system and method that overcome problems relating to safety, accuracy and difficulty encountered when using conventional hand-held cast fishing devices to cast a fastened article of fishing tackle which may be a lure or bait or any other article or body that is attached to a fishing line and included among the material cast from the apparatus. In addition to addressing the issues facing novice or handicapped anglers, the present invention employs a point-and-release casting method that eliminates problems encountered with swing or arc casting, enabling anglers to easily and safely cast in crowded spaces or limited-space environments such as when casting from under overhead manmade or natural obstructions such as power lines or tree branches. To this end, and as further depicted and explained with reference to the figures, the present invention includes a self-propelled casting apparatus that advantageously employs a constant torque spring (CTS) motor to provide a flat torque/force response both in the loading and releasing phases of a casting cycle. The flat torque response of the CTS motor facilitates ease of loading the device compared with compression spring driven devices. The present invention further encompasses a protective bobber advantageously utilized in combination with a tubular casting apparatus to improve casting and tackle handling safety.

The self-propelled casting apparatus of the present invention is the functional replacement of a conventional rod and reel combination. As explained herein, the method of the present invention advantageously employs a CTS driven launching apparatus for propelling a lure, bait, bobber, or any other article of fishing tackle that may or may not be fastened to the end of a fishing line. Such fishing tackle may comprise conventional type lures, baits, bobbers, etc., or may preferably be specially designed to accommodate the present features of the apparatus design. In one embodiment, for example, the fishing tackle may comprise chum or other fish attractant material that may be accurately slung to a desired location on the water by the present apparatus.

As is known to those familiar with spring technology, CTS motors are implemented in many different design configurations. Fundamentally, the CTS motor is a prestressed strip of spring material that is formed into a coil and stored from one end on a small storage drum. The other end is fixedly attached to a larger output drum. During the "loading" portion of the CTS motor cycle, the strip of spring material is backward wound onto the output drum. When the output drum is released, the spring material returns to the storage drum to assume its natural curvature thus rotating the output drum and providing virtually constant torque.

Providing the force for catapulting or propelling an article of fishing tackle, the CTS motor (alternately known as a constant force spring motor) offers a substantially constant motive torque during both the load and release phases of a casting cycle. This flat torque response facilitates the loading phase by reducing the maximum level of manual or electromechanical force required to load the device compared with having to overcome an exponentially increasing loading resistance as would be encountered by the use of other types of spring or elastic band mechanisms. The CTS torque response is also useful in minimizing the impulse imparted during the spring release or "launching" phase of a cast by providing a substantially constant force with which the bait or lure is accelerated, thus avoiding bait damage or separation frequently experienced when a high-impulse, whip-like action is imparted on the cast.

The fishing system of the present invention replaces a conventional rod and reel combination with a self-propelled casting apparatus utilized in conjunction with a fishing reel. The casting apparatus employs a point-and-release method of safely and accurately casting a bobber or other article of fishing tackle over a specified distance with relative ease of loading the casting mechanism. The fishing reel may be adapted for use with the present invention or may be substantially similar to a conventional reel such as a typical closed-face spincast design.

Figure 2A:
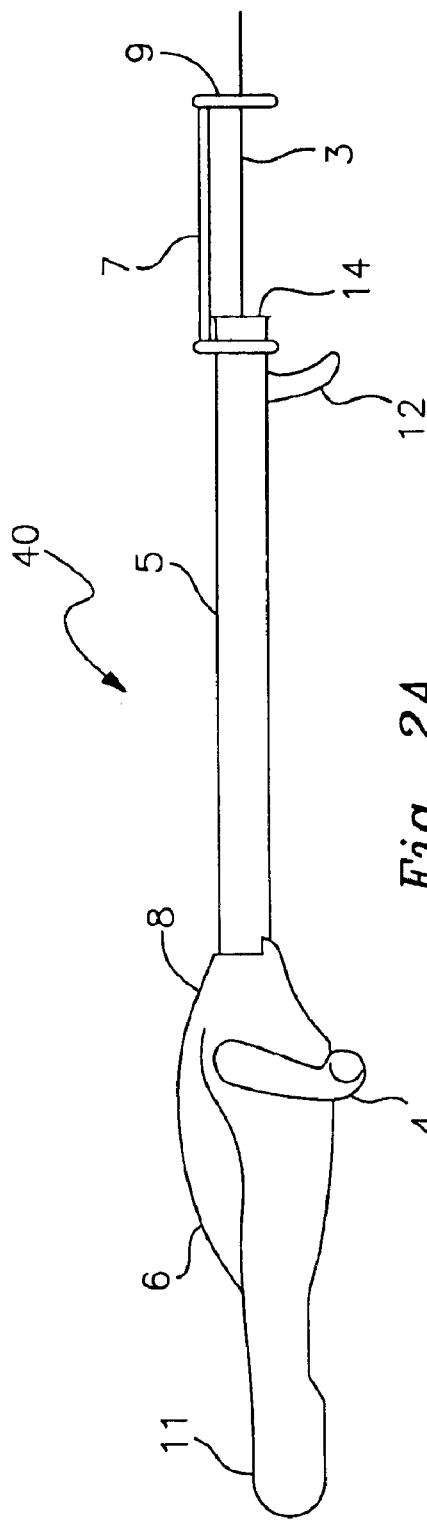
FIG. 2A depicts a self-propelled cast fishing apparatus in accordance with an alternate embodiment of the present invention.

With reference now to the figures, wherein like reference numerals refer to like and corresponding parts throughout, and in particular with reference to FIGS. 1A and 2A, there are depicted alternate embodiments of a self-propelled cast fishing apparatus in which the CTS propulsion means is forward and rear mounted, respectively. FIGS. 1A–1C illustrate the forward mounting embodiment comprising a self-propelled cast fishing apparatus 10 in which a CTS motor 20 is mounted within a housing 16 on the bottom exterior surface near the mouth 14 of a barrel tube 5. Self-propelled fishing apparatus 10 is a point-and-release device wherein CTS motor 20 is loaded during a loading phase of a casting cycle, and, when triggered during a release phase of the casting cycle, accelerates a pusher bobbin 22 along the interior length of a barrel tube 5. The impetus of pusher bobbin 22 is transferred to an article of fishing tackle such as a bobber 25, resulting in the tackle being catapulted from barrel tube 5 to a selected target area.

As shown in FIG. 1A, apparatus 10 is a single composite unit generally comprising at its proximal end, a rear support handle 2, a reel frame 8, and a crank handle 4 for supporting and operating the apparatus. Reel frame 8 houses a fishing reel mechanism, similar to that depicted in FIG. 2B, and includes a thumb release button 6 that can also serve as an access portal to the internally housed reel. Thumb release button 6 is a cast release phase actuator and is depressed to release a loaded CTS motor to effectuate an ejection of an article of fishing tackle from the mouth 14 of barrel tube 5 in the manner described below. Extending from reel frame encasement 8 is a reel crank handle 4 for operating the fishing reel in a manner such that the fishing line may be retrievably drawn into and through barrel tube 5 and into the housed reel. The outer encasement comprising rear handle 2, thumb button 6, and reel frame 8 may be constructed of any suitable material such as plastics, metals or any combination thereof.

Extending from reel frame 8, barrel tube 5 is preferably at least 25 cm in length to provide an adequately long guided propulsion forum enabling the propelled tackle sufficient time to fully accelerate from its initial resting position in accordance with the magnitude of the force applied from CTS motor 20 and the mass of the object tackle. As shown in the depicted embodiments, the mouth 14 of barrel tube 5 is preferably splayed outwardly in a funnel-like manner to assist in guiding articles of fishing tackle (not depicted) tied to the end of line 3 into the inner cavity of barrel tube 5. A pull-out line support member 7 comprises a flexible telescopically extensible rod-like member supporting an apertured eyelet 9 at its distal end through which fishing line 3 is guided and supported and which may be usefully deployed in the depicted extended position as a bite indicator and functional substitute for a conventional flexible rod tip.

In the embodiment depicted in FIG. 1A, the CTS motor is front-mounted with CTS motor housing 16 disposed at or near the open mouth 14 of barrel tube 5. FIGS. 1B and 1C depict cross-section underside and side views, respectively, of the self-propelled cast fishing apparatus shown in FIG. 1A in which CTS motor 20 and associated casting propulsion mechanisms are shown in further detail. Specifically, and referring to FIGS. 1B and 1C in conjunction with FIG. 1A, the constituent elements of the casting mechanism of the present invention include CTS motor 20 operably coupled via a draw cord 29 to a slider member 24 that slidably engages the edges of a longitudinal slot 18 running substantially the length of barrel tube 5. Extending from the inside to the outside of barrel tube 5 via of slot 18, slider member 24 provides external actuation access to a pusher bobbin 22 which provides the catapult seat or surface for propelling an article of fishing tackle such as bobber 25 from barrel tube 5. Slider member 24 and pusher bobbin 22 are preferably substantially rigid articles, and may be combined as a single integral article, made of plastic or other suitable material. Pusher bobbin 22 situated within the front, distal end of barrel tube 5 in the released position. Furthermore, pusher bobbin 22 is fixedly attached to slider 24 and is used as the catapult seat or pusher surface for projecting bobber 25 from barrel tube 5 upon release from the loaded position. Pusher bobbin 22 includes a suitable aperture for permitting fishing line 3 to pass freely between the rearward mounted fishing reel and bobber 25 during casting and retrieving of the bobber. In a preferred embodiment, pusher bobbin 22 is a cylindrical ring made of plastic or other suitable material.

Slot 18 is preferably disposed along the bottom longitudinal edge of barrel tube 5 to provide a drop-through aperture, reducing the likelihood of foreign objects becoming trapped and hazardously subject to expulsion from barrel tube 5 during a casting cycle. For mechanical efficiency, as well as safety, pusher bobbin 22 preferably presents a ring or partial ring contoured pusher face having a beveled circumferential forward edge and open central aperture to further reduce the hazards of propelling debris from barrel tube 5 during a casting cycle.

CTS motor 20 comprises a spring material 30, typically in the form of a substantially flat, pre-stressed metallic band having a persistent spiral curvature and wrapped about a pair of cylindrical drums. One of the drums is a take-up or storage drum 31 that is rotatably shaft mounted on a spindle boss. In accordance with conventional CTS motor design principles, the metallic band spring material 30 is manufactured to have a persistent spiral curvature conforming to the radial contour of storage drum 31. The opposing drum is the larger loading or output drum 32 onto which the coils of spring material 30 are backwound to load the same and store energy therein. Although the present embodiments depict CTS motors having a single storage drum and single output drum, other CTS designs that employ constant force spring principles may be utilized as the propulsion means without departing from the spirit or scope of the present invention. For example, such alternate CTS motive designs, referred to herein collectively as "CTS motors" for consistency of reference, may include designs having more than one storage or output drum.

The present invention further includes motive force translation means for translating the rotational force and angular momentum of CTS motor 20 to a linear propulsion force applied to the object fishing tackle within barrel tube 5. In the embodiment shown in FIGS. 1B, 1C and 2B, such force translation means includes a draw cord 29 having a spooled end maintained on a cord spool 19 which is mounted on a spindle boss on the same shaft as output drum 32, with the unspooled end attached to slider member 24. Being stored coaxially with output drum 32, the spooled end of loading cord 29 is withdrawn from cord spool 19 by pulling a loading actuator comprising loading handle 12 and slider member 24 to load or backwind coils from storage drum 31 onto output drum 32 and thus cock or "load" self-propelled cast fishing apparatus 10. The relative diameter of cord spool 19 with respect to that of output drum 32 is a design consideration affecting the ease with which loading cord 29 can be manually or electromechanically withdrawn, and also the relative magnitude of the propulsion force translated from CTS motor 20 to pusher bobbin 22 during a casting release phase.

As described above, in preparation for the release phase of a casting cycle, the self-propelled casting apparatus is loaded by sliding the loading actuator from its resting position near the front or distal end of the tube to a specified latching position toward the rear or proximal end of the device. To this end, the user pulls back on loading handle 12 that may be fixedly attached (FIG. 2B) or in unattached surface abutment (FIGS. 1B and 1C) with slider member 24 such that a segment of the spooled end of draw cord 29 is withdrawn, resulting in CTS motor 20 being loaded by the backwinding of the coils of spring material 30 from storage drum 31 onto output drum 32 until the loading actuator comprising loading handle 12 and slider 24 has been sufficiently withdrawn to enable the engagement of a slider latch member 28 with a corresponding latch member 28 disposed within the relative proximal end of barrel tube 5. CTS motor 20 remains latched in the loaded position until the release phase of the casting cycle in which latch members 28 are disengaged such that the energy stored by the spring material 30 during the loading phase is released as the back wound coils of spring material 30 return from output drum 32 to storage drum 31 causing storage drum 31 and coaxially mounted cord spool 19 to rotate. Draw cord 29 translates and applies the rotational force and angular momentum of cord spool 19 into a linear force, pulling the loading actuator which urges the article of fishing tackle forward and out through the open mouth 14 of barrel tube 5.

In the foregoing manner, the CTS motor's path of motion is characterized by the circular shape of its constituent cylindrical drums 31 and 32. That is, although the propulsion path of the fishing tackle article through barrel tube 5 is essentially straight or axial, the CTS motor powering means is circular in shape and thus assumes a relatively compact outer dimension.

Although not explicitly depicted in the FIGS. 1A–1C, the externally mounted CTS motor can be fixedly coupled to the barrel by the use of one or more of a variety of mechanical fastener means such as screws or adhesion methods (glues, epoxies, soldering, welding, etc.) It should be further noted that the present invention, the CTS motor may be suitably mounted in several possible orientations with respect to the barrel tube without departing from the spirit or scope of the present invention.

Figure 2B:
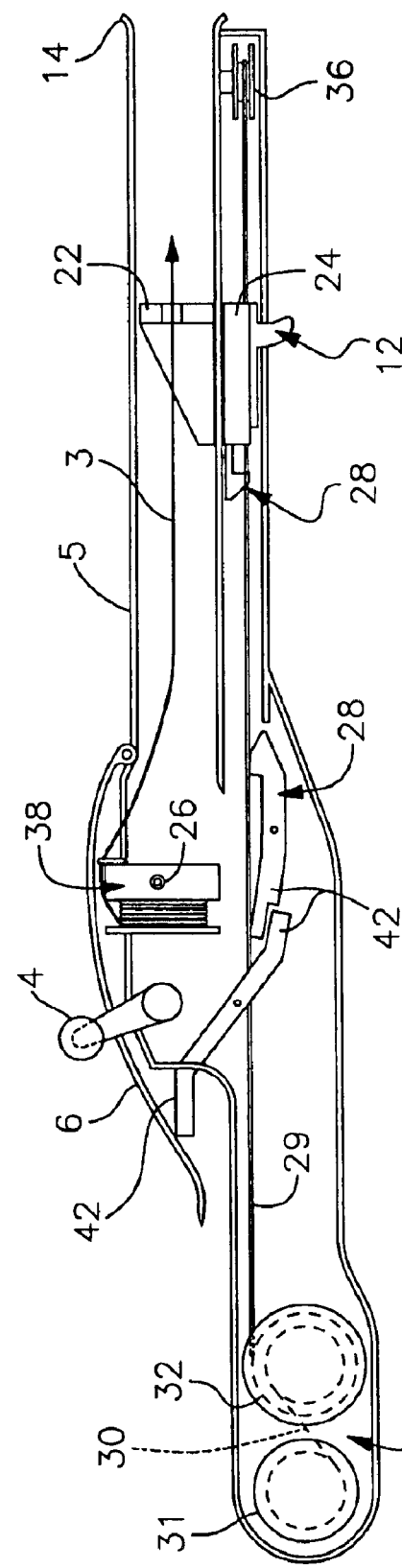
FIG. 2B illustrates a cross-section side view of the self-propelled cast fishing apparatus shown in FIG. 2A.

Further detail regarding an exemplary reel mechanism included in the cast fishing apparatus of the present invention is shown in FIGS. 2A and 2B, which furthermore depict an alternative CTS casting apparatus in which CTS motor 20 is rear-mounted and encased within the rear support handle 11 of the device. As illustrated in FIG. 2B, the reel mechanism generally comprises the fundamental line handling features of a conventional fishing reel such as a closed-face spincast reel. Specifically, the reel mechanism includes a line spool 38 for storing fishing line 3 and a rotatable pickup head 26 manually rotated by crank handle 4 for catching and retrieving the line onto spool 38. Typically, pickup head 26 is designed having pickup slots or selectively retractable pickup pins to engage the line as pickup head 26 is rotated.

FIG. 2B further depicts an exemplary cast actuator mechanism for disengaging latches 28 to initiate a release phase of a casting cycle. As shown in the depicted embodiment, thumb button 6 is a push button lever utilized to operate a compound latch release lever 42 that in turn actuates an associated latch member 28 to disengage a corresponding latch member 28 on slider 24 to release slider 24 and pusher bobbin 22 from the fixed, latched position. In addition to actuating compound release lever 42, depressing thumb button 6 actuates line release means (not depicted), which withdraws or otherwise actuates pickup head 26 to disengage the fishing line 3 from line spool 38. The operating principles and structure of such line release means, as actuated by a push button lever such as thumb button 6, are well understood by those skilled in the art and are thus not explained in further detail herein. Actuation contact between thumb button 6 and the line release means and between thumb button 6 and compound latch release lever 42 are designed to occur sequentially such that the lever action of thumb button 6 actuates the line release means just prior to actuating compound lever 42. In this manner, the release of the CTS driven pusher bobbin 22 via compound lever 42 is actuated simultaneously with or immediately subsequent to the release of fishing line 3. The rear mounting of CTS motor 20 is enabled by the use of a frontally mounted draw cord pulley 36 around which draw cord 29 is pulleyed within a loading actuator chamber 27 in a rearward direction toward the proximal end of barrel tube 5.

The net effect of the foregoing CTS propulsion mechanics is that upon depressing thumb button 6, an article of fishing tackle such as bobber 25, which is situated at or near the proximal closed end of barrel tube 5 is ejected from open barrel mouth 14. Following a casting cycle, bobber 25, which is tied to the end of line 3, may be retrieved using the housed reel mechanism back into barrel tube 5. As shown in the figures, barrel mouth 14 is preferably splayed in a funnel-like manner to facilitate the entry of the bobber or other article of fishing tackle into the barrel tube. In a preferred embodiment, and as depicted and explained in further detail with reference to FIGS. 7A and 7B, the top edge of the bobber is preferably tapered to further facilitate retrieval of the bobber into barrel tube 5. It should be noted that in its most general essence, the present invention is directed to utilizing and leveraging the characteristics of CTS motors to provide an improved system and method for propelling fishing tackle. Fundamentally, the present invention employs a support structure on which or in which an article of fishing tackle is supported, and furthermore utilizes a CTS-driven propulsion mechanism for propelling the tackle from the support member. A tubular support member may be advantageously utilized as the support member as depicted and explained with reference to FIGS. 1A–1C and 2A–2B. It should be understood, however, that alternate support member designs may be utilized to support the fishing tackle. For example, a pole or rod-like member may be used as the support member with an apertured pusher member and article of fishing tackle slidably supported thereon.

Figure 3A:
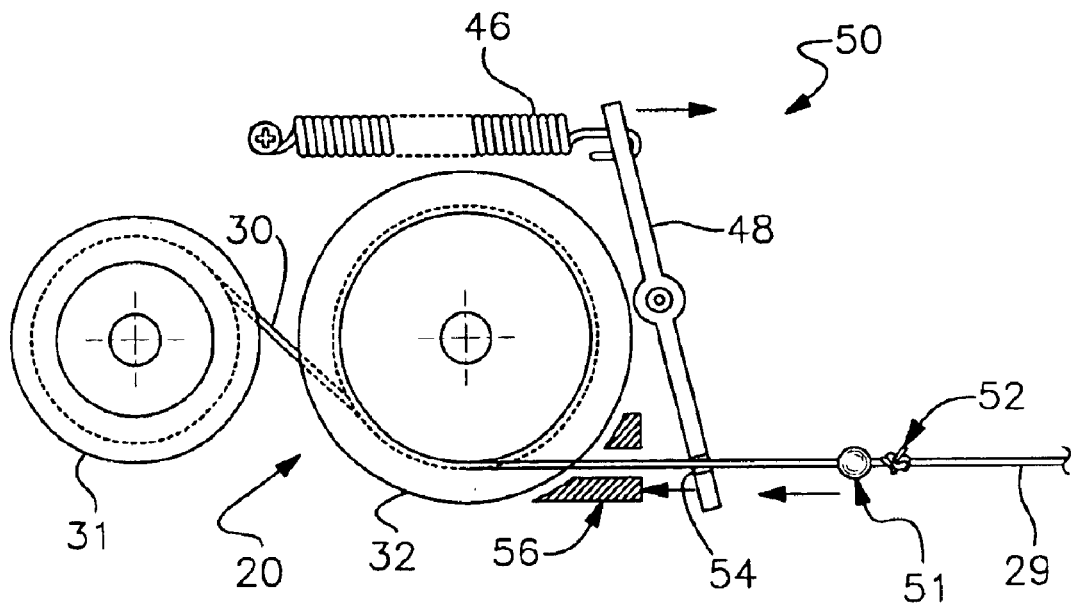
FIGS. 3A and 3B depict shock absorber means in accordance with one embodiment of the present invention.
Figure 3B:
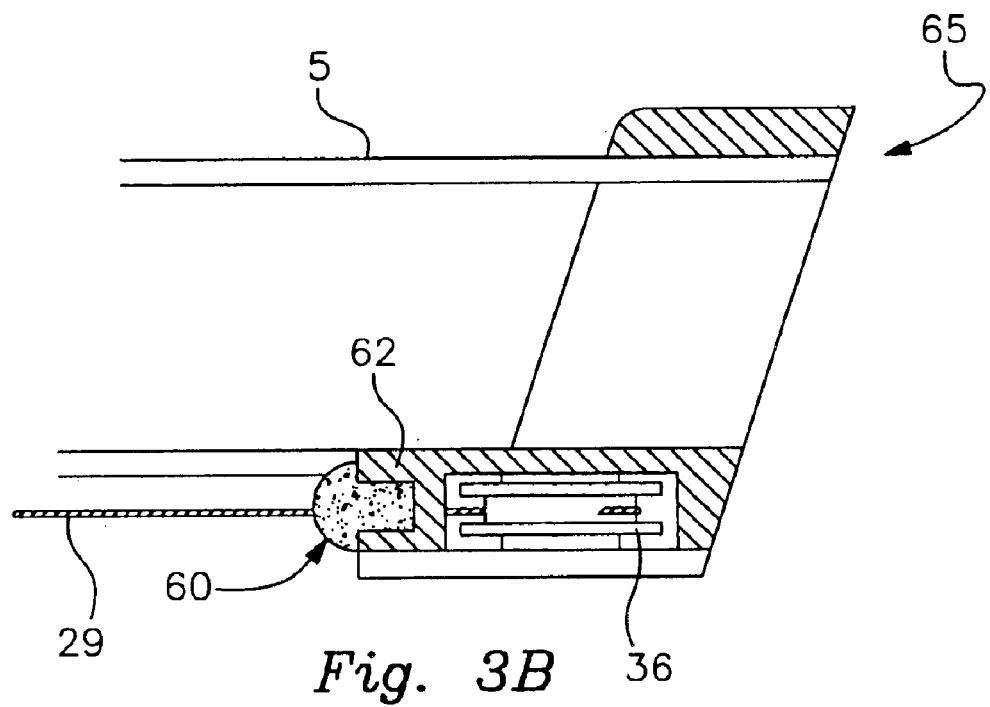

With reference to FIGS. 3A and 3B, there are depicted shock absorber means that may be utilized in conjunction with the different cast fishing apparatus embodiments depicted herein. FIG. 3A depicts a CTS motor stop 50 the may be implemented with the front-mounted CTS motor design shown in FIGS. 1A–1C, while FIG. 3B depicts a tube end stop 65 that may be used with the rear-mounted CTS motor design shown in FIGS. 2A–2B. As shown in FIG. 3A, CTS motor stop 50 comprises a pivotal lever member 48 proximally located with respect to CTS motor 20 such that lever 48 is between CTS motor 20 and the loading actuator means comprising slider 24 and pusher bobbin 22. Lever member 48 is coupled at one end to an extension spring 46, which applies a continuous retraction force thereto. The other end of lever member 48 includes an aperture 54 through which draw cord 29 passes until a rubber ball 51 and/or knot 52 in the draw cord reaches the aperture at which point the impact force of the released incoming draw cord is absorbed by extension spring 46 and a stopper surface 56. As depicted in FIG. 3B, tube end stop 65 is disposed near the open end of barrel tube 5 between draw cord pulley 36 and the loading actuator means and comprises a preferably rubber shock absorber member 60 coupled to draw cord 29 such that at the end of the release phase travel of slider 24, rubber shock absorber 60 contacts a front end stopper 62, which in one embodiment may comprise a coil spring for damping the mechanical impulse that would otherwise be imparted by slider 24.

Figure 4A:
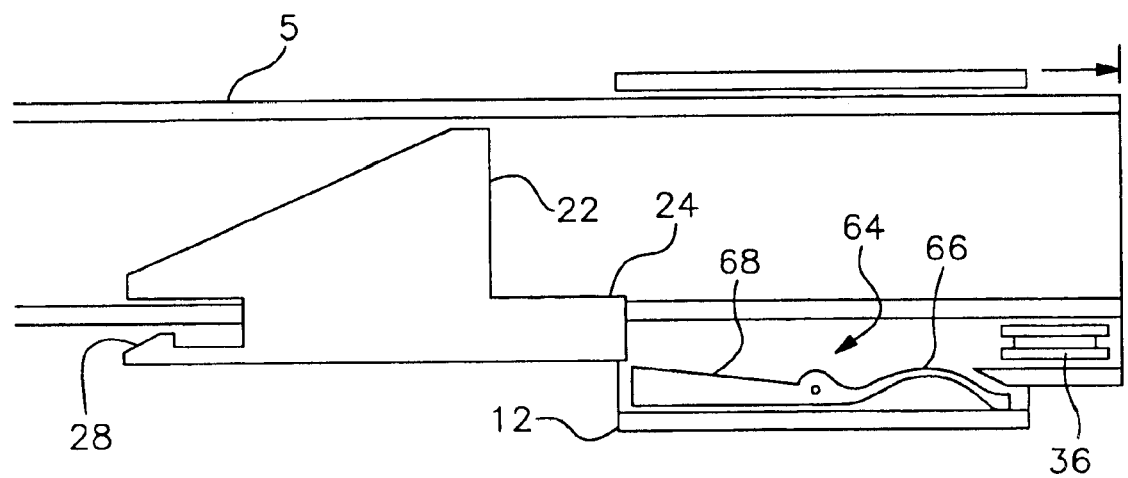
FIGS. 4A–4D illustrate a launch slide safety release mechanism as employed within the casting apparatus of the present invention.
Figure 4B:
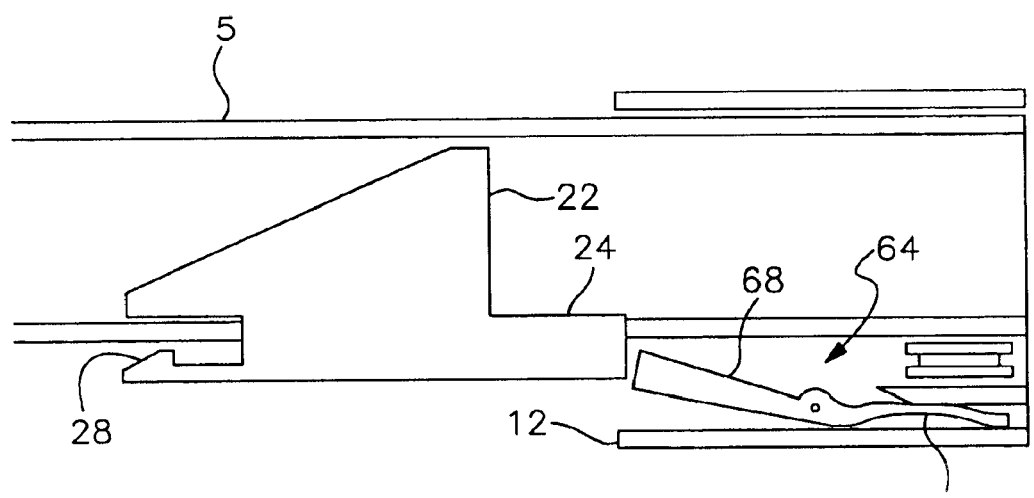

FIGS. 4A–4D illustrates a launch slide safety release mechanism as employed within the casting apparatus of the present invention. The function of the safety release mechanism is to maintain positioning independence between loading handle 12 and the combined slider 24 and pusher bobbin 22 unit during the release phase of a casting cycle. The safety release mechanism shown in FIGS. 4A–4D generally comprises a locking mechanism 64 that is coupled to the top edge of loading handle 12. As depicted in FIG. 4A, in order to engage the loading actuator mechanism, loading handle 12 must be urged to the forward distal end of barrel tube 5 such that a leaf spring end 66 of locking mechanism 64 slides under a beveled surface at or near draw cord spool 36. As illustrated in FIG. 4B, the compression of leaf spring 66 at the distal end urges an opposing lever arm 68 of locking member 64 to raise slightly and engage the edge of slider 24 in preparation for loading handle 12 being pulled back toward the proximal end of barrel tube 5.

Figure 4C:
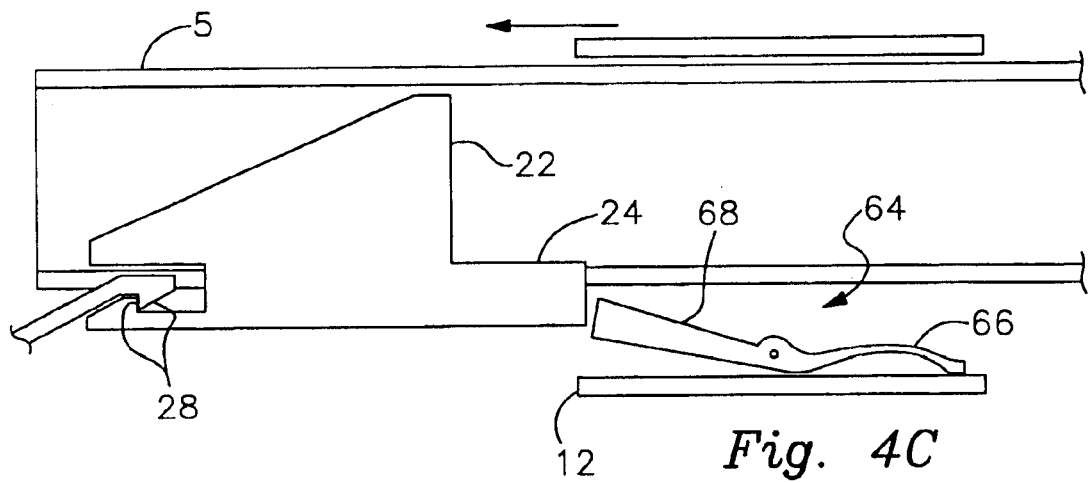
Figure 4D:
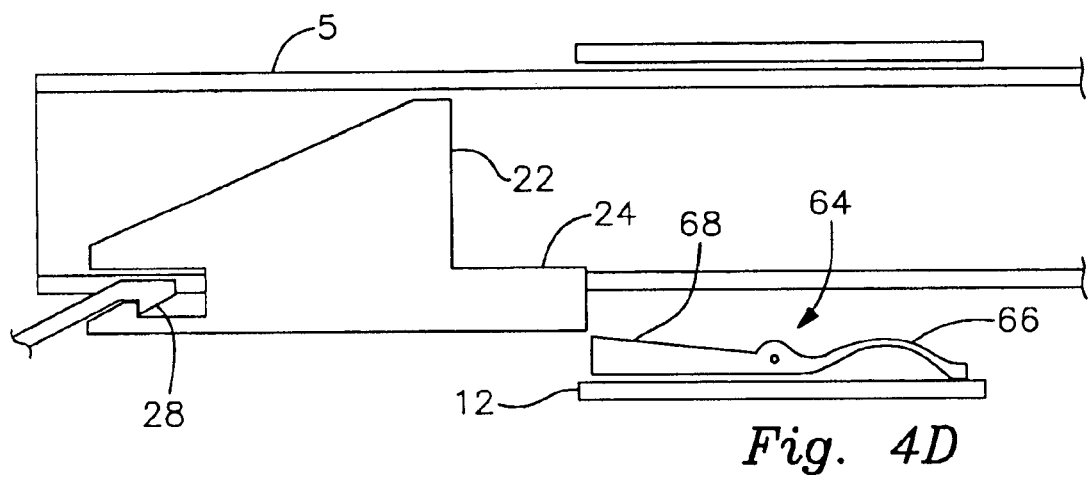

As depicted in FIG. 4C, the loading actuator, comprising loading handle 12 and slider 24, is pulled back until latches 28 engage at which point, and as shown in FIG. 4D, the manually applied pulling pressure on loading handle 12 is released and lever 68, as biased by leaf spring 66, returns to its unraised position, thus disengaging loading handle 12 from the edge of slider 24 for the ensuing release phase of the casting cycle.

Figure 5:
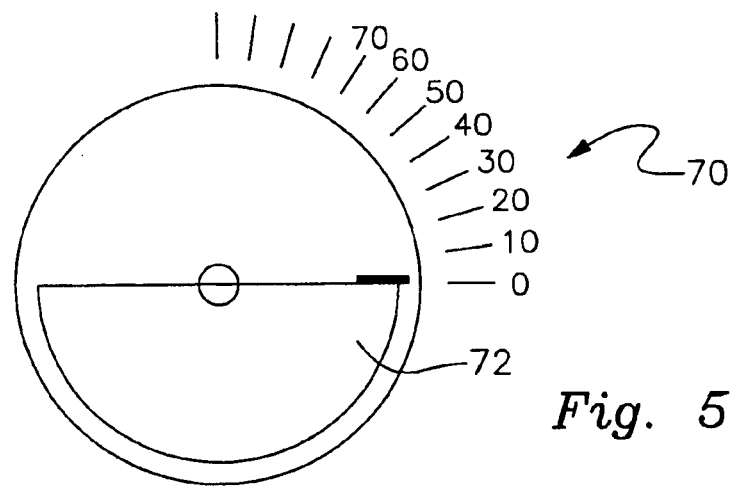
FIG. 5 depicts a cast distance estimator in accordance with the present invention.

The present invention further provides a device and method by which a user can judge and control the distance of a given cast. With reference to FIG. 5, there is illustrated a cast distance estimator 70 that may be advantageously utilized in concert with the CTS propelled casting apparatus of the present invention. In the depicted embodiment, distance estimator 70 comprises a solid weighted semicircular pendulum 72 that freely rotates about a center axis within a background scale marker readout that is fixed to the apparatus. Pendulum 72 and the associated scale readout is affixed to the body of the cast fishing apparatus. As the front end of the casting apparatus is elevated, pendulum 72 rotates with respect to the markings included on the readout such that the edge of the pendulum may be utilized as a pointer to the markings. The relative orientation of pendulum 72 with the scale markings provides an indication of the estimated distance that the ejected article will travel at the present angle of the barrel tube. Furthermore, the pendulum gauge can be advantageously utilized as a means of restricting the triggering of the CTS motor to a designated range of elevation angles.

Figure 6A:
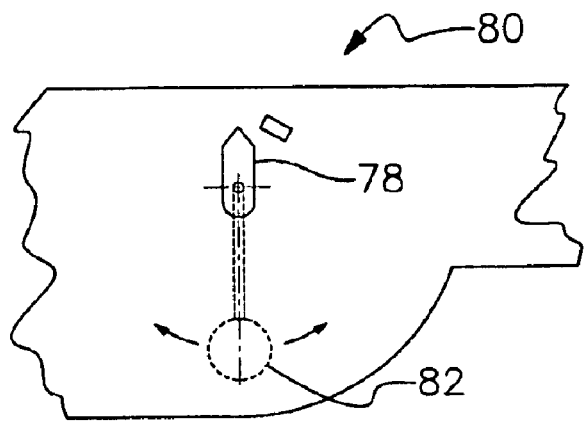
FIGS. 6A–6C illustrate a cast distance estimator in accordance with an alternate embodiment of the present invention.
Figure 6B:
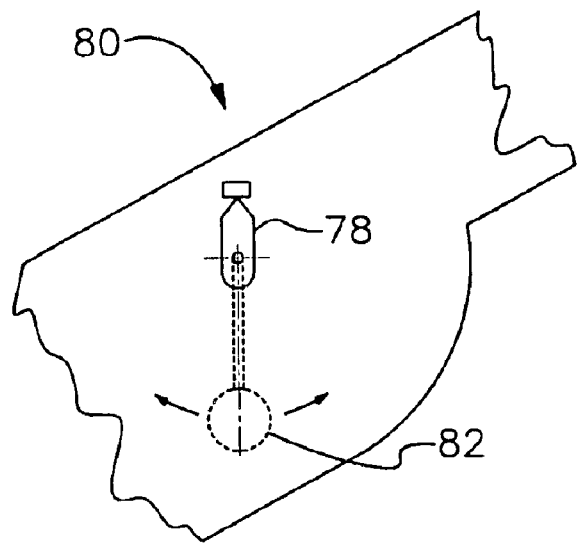
Figure 6C:
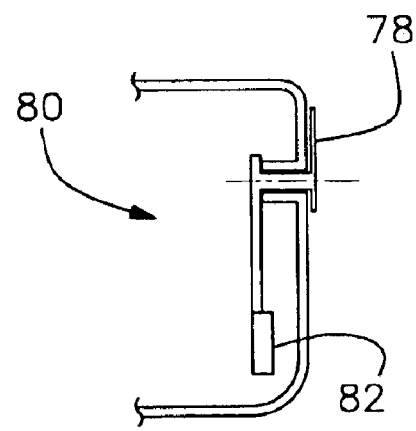

FIGS. 6A–6C illustrate an alternate cast distance estimator 80 as included with the cast fishing apparatus of the present invention. As shown in FIGS. 6A–6C, cast distance estimator 80 has an external pointer 78 that freely rotates on the exterior side of the casting apparatus and point with respect to fixed angle/distance scale markings. An internally encased pendulum weight 82 controls the direction at which the indicator 78 points at any given time in accordance with the current angle of elevation of the casting apparatus barrel.

Figures 7A, 7B:
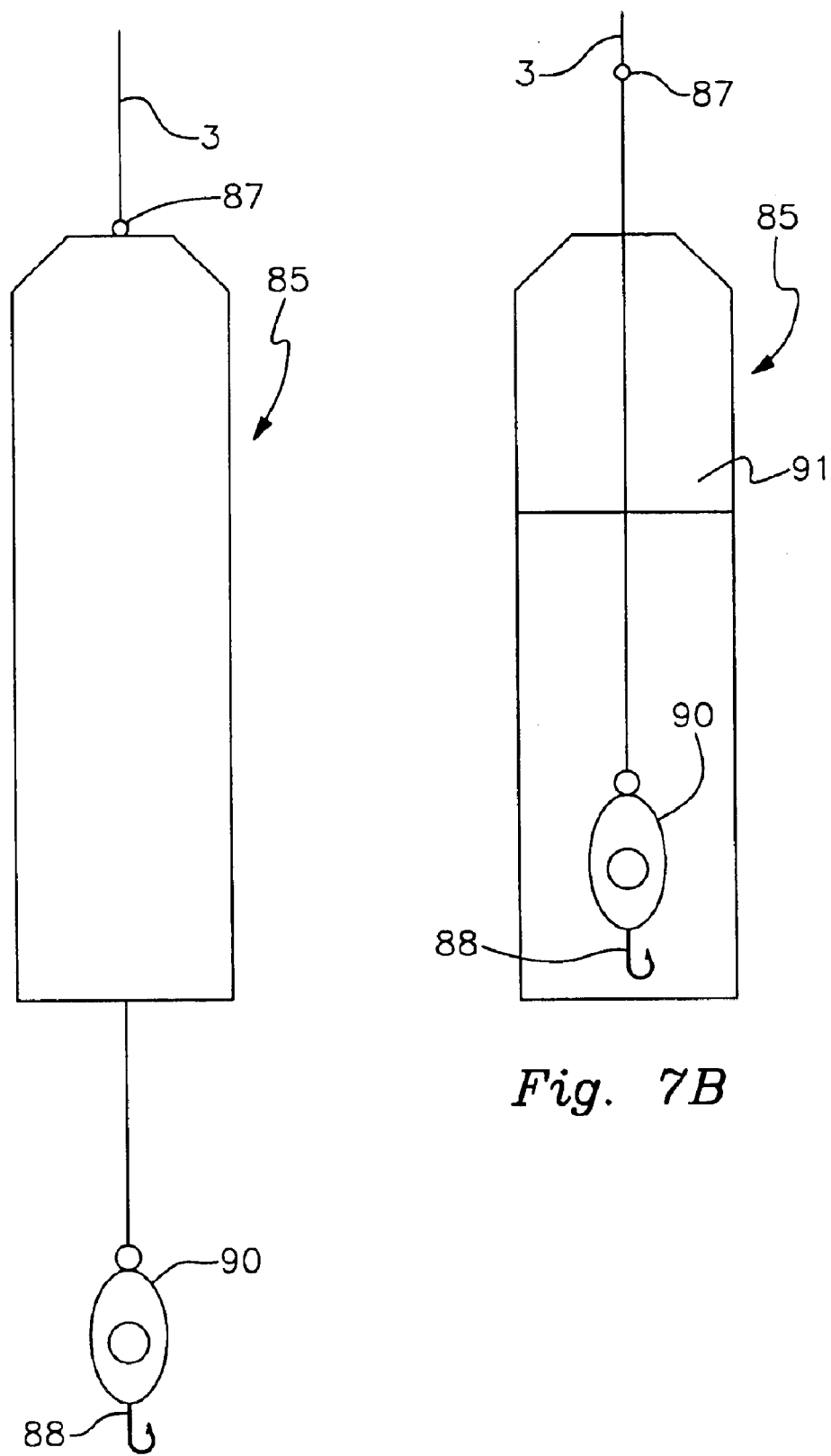
FIGS. 7A–7B depicts bobber device utilized in accordance with one embodiment of the present invention.

The invention disclosed herein further relates to the field of bobber/float devices that may be advantageous utilized with a self-propelled cast fishing apparatus. As illustrated in FIG. 7, one embodiment of the invention encompasses an improved bobber/float device 85 and method for using the same. In accordance with the present invention, as the fishing line is reeled in, bobber 85 slides inside a protective barrel and the hook, bait, and sinker are drawn into and enclosed by the bobber where they remain until the bobber strikes the water. As depicted in FIGS. 7A and 7B the top edge of bobber 85 is tapered to facilitate withdrawing bobber 85 into a barrel tube chamber. Furthermore, the distance between the bait hook and the bobber can be governed by a slip knot or sliding bead 87 which may be wound onto the fishing reel.

In addition to facilitating loading within a barrel tube, the design of bobber 85 also addresses the disadvantage of conventional bobber configurations wherein a second piece of line (between the bobber and hook) is maintained unspooled and free from below the bobber during the casting motion such that the range of casting motion is substantially restricted by the danger of the exposed hook.

Bobber 85 reduces this problem by encasing the hook 88 until the bobber is cast into the water. To this end, bobber 85 includes a hollow cavity 91 for storing the hook or lure. One end of bobber 85 has an opening into cavity 91 that is sized sufficiently for receiving the hook and any attached bait. The other end of bobber 85 contains a channel for passing the fishing line through the bobber and its cavity. The other end is threaded into a coupling device which secures the line when released with the other end of this coupling securing the hook in the same manner. When bobber 85 is in use, the fishing line 3 freely passes through the bobber channel and cavity. When the line is fully retracted into the fishing reel spool in preparation for casting, the hook 88 is encased within the bobber.

In a related feature of the invention, a weighted sinker 90 is affixed to the fishing line 3 in close proximity to the knot tied at or near the fishing hook. Sinker 90 is sized larger than the bobber's channel, such that it will not pass through the bobber.

In a preferred embodiment of the invention, the bobber assembly is used with a self-propelled casting device such as those depicted in FIGS. 1A–1C and 2A–2B. The bobber is contained within the barrel tube when retracted. In addition to the ejection assemblies disclosed herein, the casting apparatus utilized with the improved bobber system may be any conventional type or may be an alternative ejection assembly such as spring-loaded, elastic or air pressured ejection unit.

An important advantage of using the present apparatus and method lies in the substantially constant torque/force characteristics of the CTS motor. The CTS motor provides a constant or "flat" torque response over the duration of relatively long deflections in which the rotary motion from the loading drum is translated to linear motion of the unspooled drawstring during loading. Unlike other pushing or pulling spring-type mechanisms, the force required to load the CTS motor remains substantially constant throughout the loading process in which the draw cord is pulled. The flat torque response of the motor is also beneficial during the release phase of the CTS cycle by imparting a relatively constant acceleration and minimizing the impulse induced early in the ejection process which can be potentially damaging to live bait or may even separate the bait from the hook.

As incorporated in the apparatus of the present invention, CTS motors can be configured in many different ways. The speed, acceleration, and length of run to which the spring will coil and uncoil is determined by the materials and dimensions used to build the flat spring as well as the relative radial dimensions of the take-up and loading spools. Structural parameters affecting the performance of a CTS motor include number and configuration of storage and output drum(s), spring material width, the spring material thickness, the spring length, the distance between the drums, the storage drum diameter, the torque drum diameter, the outside diameter of the spring when fully wound on the storage drum, and the outside diameter of the spring when fully wound on the torque drum.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

What is claimed is:

1. A self-propelled cast fishing apparatus comprising:
   a support member;
   a constant torque spring motor fixedly positioned with respect to said support member, wherein said constant torque spring motor comprises a strip-like spring material wound onto at least one storage drum and at least one output drum and imparts a propulsion force for propelling an article of fishing tackle from said support member; and
   motive force translation means for translating the rotational force of said at least one output drum during a release phase of a casting cycle to a linear propulsion force applied to the article of fishing tackle, wherein said motive force translation means comprises a draw cord having a first end wound onto a draw cord spool and a second end attached to a pusher member that pushes the article of fishing tackle along said support member, wherein said draw cord spool is coaxially mounted with respect to said at least one output drum such that said draw cord spool rotates in conformity with the rotation of said at least one output drum.

2. The self-propelled cast fishing apparatus of claim 1, wherein said support member comprises a hollow barrel tube having a distal open mouth end from which the article of fishing tackle is propelled.

3. The self-propelled cast fishing apparatus of claim 2, wherein said barrel tube includes a distal open mouth from which that article of fishing tackle is propelled, said self-propelled cast fishing apparatus further comprising a flexible pull-out line support member attached to said barrel tube and extending distally beyond the open mouth end.

4. The self-propelled cast fishing apparatus of claim 3, wherein said line support member comprises a telescopically extensible rod-like member supporting an apertured eyelet.

5. The self-propelled cast fishing apparatus of claim 1, wherein said spring material comprises a pre-stressed metallic band having a persistent spiral curvature conforming to said at least one storage drum.

6. The self-propelled cast fishing apparatus of claim 1, wherein said spring material is stored on said at least one storage drum prior to and following the casting cycle.

7. The self-propelled cast fishing apparatus of claim 1, wherein said constant torque spring motor imparts the propulsion force during the release phase of the casting cycle during which said spring material rotatably unwinds from said at least one output drum onto said at least one storage drum.

8. The self-propelled cast fishing apparatus of claim 7, wherein said spring material is back wound from said at least one storage drum onto said at least one output drum during a loading phase of a casting cycle.

9. The self-propelled cast fishing apparatus of claim 1, wherein said support member comprises a hollow barrel tube, said self-propelled cast fishing apparatus further comprising a slider member coupled to said pusher member, wherein said slider member provides external access to said pusher member such that said pusher member may be urged by a user into a loaded position within said barrel tube.

10. The self-propelled cast fishing apparatus of claim 9, wherein said barrel tube includes a longitudinal slot through which said slider member is coupled to said pusher member.

11. The self-propelled cast fishing apparatus of claim 10, wherein said longitudinal slot is disposed along a bottom longitudinal edge of said barrel tube.

12. The self-propelled cast fishing apparatus of claim 10 further comprising a loading handle attached to said slider member, wherein said loading handle is manually movable along said longitudinal slot to urge said pusher member to the loaded position.

13. The self-propelled cast fishing apparatus of claim 12, wherein said loading handle includes means for disengaging said loading handle from said slider member prior to the release phase of a casting cycle.

14. The self-propelled cast fishing apparatus of claim 9, further comprising a cast actuator having latch release means for releasing said slider member from a latched position such that said pusher member pushes said article of fishing tackle toward an open mouth end of said barrel tube.

15. The self-propelled cast fishing apparatus of claim 14, wherein said article of fishing tackle is attached to a fishing line, said self-propelled cast fishing apparatus further comprising a reel for retrievably maintaining the fishing line onto which said article of fishing tackle is attached, wherein said reel includes line release means for mechanically releasing the fishing line from the spool.

16. The self-propelled cast fishing apparatus of claim 15, wherein said cast actuator comprises an external push button lever that sequentially actuates said line release means and said latch release means such that the fishing line is released from the spool prior to said slider member being released from its latched position.

17. A casting system comprising:

a tubular support member having a distal open mouth end from which an article of fishing tackle is propelled;

a constant torque spring motor fixedly positioned with respect to said tubular support member, wherein said constant torque sprig motor comprises a strip-like spring material wound onto at least one storage drum and at least one output drum and imparts a propulsion force for propelling the article of fishing tackle from said tubular support member; and motive force translation means for translating the rotational force of said at least one output drum during a release phase of a casting cycle to a linear propulsion force applied to the article of fishing tackle, wherein said motive force translation means comprises a draw cord having a first end wound onto a draw cord spool and a second end attached to a pusher member that pushes the article of fishing tackle along said tubular support member, wherein said draw cord spool is coaxially mounted with respect to said at least one output drum such that said draw cord spool rotates in conformity with the rotation of said at least one output drum.

18. The casting system of claim 17, further comprising a flexible pull-out line support member attached to said tubular support member and extending distally beyond the open mouth end.

19. The casting system of claim 18, wherein said line support member comprises a telescopically extensible rod-like member supporting an apertured eyelet.

20. The casting system of claim 17, wherein said spring material comprises a pre-stressed metallic band having a persistent spiral curvature conforming to said at least one storage drum.

21. The casting system of claim 17, wherein said spring material is stored on said at least one storage drum prior to and following the casting cycle.

22. The casting system of claim 17, wherein said constant tongue spring motor imparts the propulsion force during the release phase of the casting cycle during which said spring material rotatably unwinds from said at least one output drum onto said at least one storage drum.

23. The casting system of claim 22, wherein said spring material is back wound from said at least one storage drum onto said at least one output drum during a loading phase of a casting cycle.

24. The casting system of claim 17, further comprising a slider member coupled to said pusher member, wherein said slider member provides external access to said pusher member such that said pusher member may be urged by a user into a loaded position within said tubular support member.

25. The casting system of claim 24, wherein said tubular support member includes a longitudinal slot through which said slider member is coupled to said pusher member.

26. The casting system of claim 25, wherein said longitudinal slot is disposed along a bottom longitudinal edge of said tubular support member.

27. The casting system of claim 25, further comprising a loading handle attached to said slider member, wherein said loading handle is manually movable along said longitudinal slot to urge said pusher member to the loaded position.

28. The casting system of claim 27, wherein said loading handle includes means for disengaging said loading handle from said slider member prior to the release phase of the casting cycle.

29. The casting system of claim 24, further comprising a cast actuator having latch release means for releasing said slider member from a latched position such that said pusher member pushes said article of fishing tackle toward said open mouth end of said tubular support member.

30. The casting system of claim 29, wherein said article of fishing tackle is attached to the fishing line, said casting system further comprising the reel for retrievably maintaining the fishing line onto which said article of fishing tackle is attached, wherein said reel includes line release means for mechanically releasing the fishing line from the spool.

31. The casting system of claim 30, wherein said cast actuator comprises an external push button lever that sequentially actuates said line release means and said latch release means such that the fishing line is released from the spool prior to said slider member being release from its latched position.

* * * * *